United States Patent
Hietmann et al.

(10) Patent No.: US 8,645,098 B2
(45) Date of Patent: Feb. 4, 2014

(54) HAND-HELD DEVICE AND METHOD FOR DETECTING THE SPATIAL POSITION OF A WORKING POINT OF A MANIPULATOR

(75) Inventors: Gerhard Hietmann, Herbertshofen (DE); Andreas Sedlmayr, Fürstenfeldbruck (DE)

(73) Assignee: Kuka Roboter GmbH, Augsburg (DE)

( * ) Notice: Subject to any disclaimer, the term of this patent is extended or adjusted under 35 U.S.C. 154(b) by 425 days.

(21) Appl. No.: 12/640,633

(22) Filed: Dec. 17, 2009

(65) Prior Publication Data

US 2010/0153061 A1   Jun. 17, 2010

(30) Foreign Application Priority Data

Dec. 17, 2008   (DE) .................. 10 2008 062 624

(51) Int. Cl.
*G01C 9/00* (2006.01)
(52) U.S. Cl.
USPC ........................ 702/152; 702/150; 702/153
(58) Field of Classification Search
USPC .......................... 702/152–153, 155
See application file for complete search history.

(56) References Cited

U.S. PATENT DOCUMENTS

| | | |
|---|---|---|
| 2003/0221326 A1 | 12/2003 | Raab et al. |
| 2005/0033315 A1* | 2/2005 | Hankins ................... 606/129 |
| 2007/0273643 A1* | 11/2007 | Erez et al. ................ 345/156 |
| 2008/0216552 A1* | 9/2008 | Ibach et al. ............... 73/1.01 |

FOREIGN PATENT DOCUMENTS

| | | |
|---|---|---|
| DE | 10048952 A1 | 4/2002 |
| WO | WO-01/30545 A1 | 5/2001 |

OTHER PUBLICATIONS

European Extended Search Report for 13000946.7-1802, dated Apr. 18, 2013 (5 pages).
First Chinese Office Action for 200910261204.X dated Mar. 4, 2013 (14 pages).

* cited by examiner

*Primary Examiner* — Mischita Henson
(74) *Attorney, Agent, or Firm* — Choate, Hall & Stewart LLP; Andrea L. C. Robidoux; Daniel S. Matthews

(57) ABSTRACT

According to the present invention a portable hand-held device (1) for detecting the spatial position of a working point of a manipulator, in particular of a robot, comprises handling means (2, 3) for handling the hand-held device by a user, means for detecting a position (4), wherein a spatial position of the means for detecting a position (4) is detectable; and a tactile element (5) which is connected, preferably detachably connected, to the means for detecting a position and at which a reference point (R) is defined, wherein the handling means (2, 3) and the means for detecting a position (4) are connected with one another by a joint.

12 Claims, 2 Drawing Sheets

Figure 4:
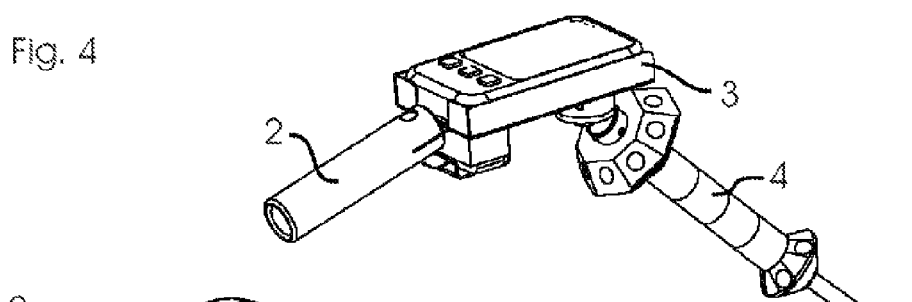

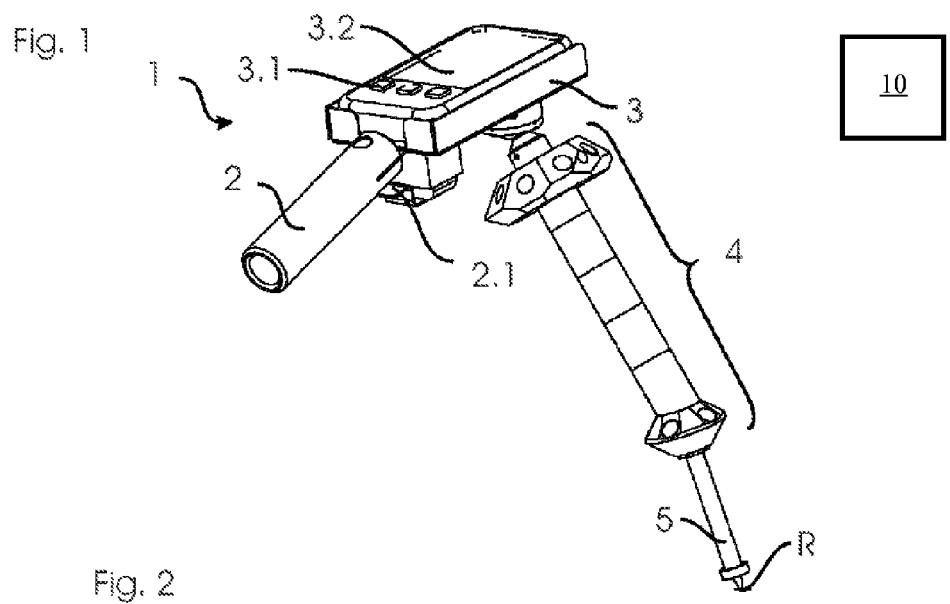
Fig. 1
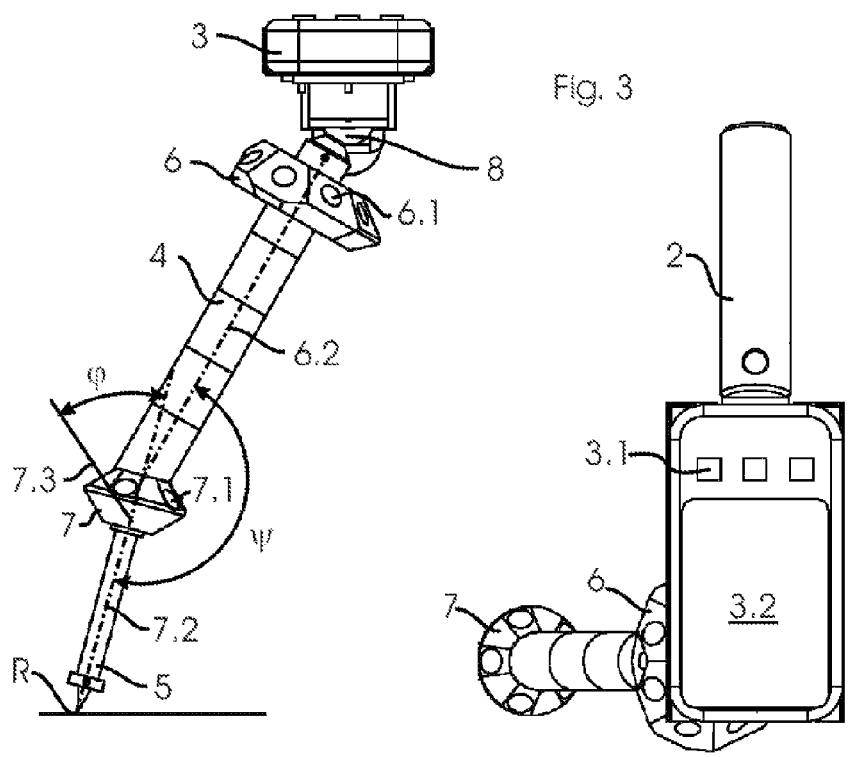
Fig. 2
Fig. 3

HAND-HELD DEVICE AND METHOD FOR DETECTING THE SPATIAL POSITION OF A WORKING POINT OF A MANIPULATOR

The present invention relates to a portable hand-held device and a method for detecting the spatial position of a working point of a manipulator, in particular a robot.

In many applications, when carrying out a program a manipulator moves a tool reference coordinate system, the so-called Tool Center Point ("TCP"), to different working points, whose spatial positions have been saved before within the manipulator control. Examples may be sequences of welding points or painting trajectories, which are processed by industrial robots. Working points can, however, also be approached by other reference coordinate systems of the manipulator, for example by a root point of a manipulator hand.

In the present context, generally the location of a point, i.e. its distance components to the origin of a reference coordinate system, and/or the orientation of a coordinate system of the point relative to a reference coordinate system, is named a position of this point. Thus, the position of a working point in space can for example be described by Cartesian coordinates (x, y, z) of the origin of the TCP in a coordinate system, which is defined in the base of a manipulator or a working cell, and EULER- or KARDAN-angles ($\alpha$, $\beta$, $\gamma$) of the TCP with respect to this coordinate system.

To approach such a working point, a manipulator must adopt certain joint postures or coordinates, for example rotating angles, of its joints. When the kinematics of the manipulator is known, joint coordinates and positions of the TCP in workspace can be transformed into one another by solving the forward and backward kinematics respectively. A spatial position of a working point of a manipulator in the meaning of the present invention thus can for example be given in workspace, for example by Cartesian coordinates and angles of orientation in a reference coordinate system, or by joint coordinates of the manipulator, and can be saved in the manipulator control accordingly.

To save or record such working points, besides offline-programming and the so-called teaching where the working points are approached with the manipulator, from WO 01/30545 A1 already a portable hand-held device is known, whose spatial position is detected by a optical tracking system and accelerometers, and which comprises a tactile element with a defined reference point. By moving the hand-held device, the user directs this reference point into the desired working point, where the spatial position of the reference point is detected by the tracking system and the accelerometers and is saved as position of the working point.

DE 100 48 952 A1 describes a portable hand-held device according to the preamble of claims 1 and 10 as well as a method according to the preamble of claim 11 for this purpose. However, this solution comprises some different independend drawbacks.

Generally, DE 100 48 952 A1 suggests to deviate a tactile element relative to sensors of the hand-held device in order to ease optical contact between the optical sensors and reference markings of a tracking systems. However, this does not only change the transformation between the detected spatial position of the sensors and the reference point of the tactile element, which requires an additional detection of this variable transformation and introduces an additional source of error. It also does not simplify the handling of the hand-held device, since the keyboard (which must be actuated) and the display (which must be read) are connected to the sensors. If the sensors must be brought into a certain position by turning around the reference point which remains in the working point, in order to enable optical contact to the reference markings, for example by the disclosed deviating of the tactile element and the sensors against each other, this can bring keyboard and display into a position which is disadvantageous or uncomfortable for the user.

On the other hand, so far only macros can be initialized or other programming commands can be input via the keyboard to save the position and to edit a program. If, however, additional axes must be actuated when recording the working points, for example when moving a work piece by turning and tilting a table in order to reach different working points, the user must still control these axes via a separate control.

When recording the spatial positions, due to tolerances in measurement and calculation, saved working points may wrongly lay within the contour of the work piece. Correction of such saved spatial positions is cumbersome.

It is an object of the present invention to improve the detection of spatial positions of working points and to avoid at least one of the aforementioned drawbacks.

This object is solved by a portable hand-held device with the features of claim 1 or 10 respectively and by a method with the features of claim 11 respectively. Claim 12 refers to an according computer program product with program code which is recorded on a non-transitory carrier readable by a computer and which comprises a computer program, depending claims refer to advantageous modifications.

A portable hand-held device according to the present invention for detecting, in particular recording, the spatial position of at least one working point of a manipulator, in particular of a robot, comprises handling means for handling the hand-held device by a user, means for detecting a position, whose spatial position is detectable, and a tactile element connected with these means for detecting a position, wherein a reference point is defined at the tactile element.

Handling means can in particular comprise input means for input by the user, for example one or more keys, switches or the like, output means for output to the user, in particular one or more displays, and/or a handle for the user. Means for detecting a position can comprise one or more markings which are detectable by reference system-fixed tracking means, or sensors, which themselves detect reference markings of a reference system, and thus enable detection of the spatial position of the means for detecting a position.

According to a first aspect of the present invention it is suggested that handling means and means for detecting a position are connected with one another by at least one joint. This, on the one hand side, allows to bring means for detecting a position into a favourable position in which for example their spatial position is well detectable, since for example enough markings are visible for an optical tracking device, or in which for example the tactile element connected to the means for detecting a position simulates a desired position of a manipulator tool, and, on the other hand side, to bring at the same time handling means into an advantageous spatial position, in which for example its display can be seen well, its keyboard can be actuated well or in which its handle is ergonomically advantageously positioned.

To this purpose, according to a preferred embodiment, handling means and means for detecting a position can be connected with one another by a pivot or revolute joint with one or more rotational degrees of freedom, preferably three rotational degrees of freedom, as provided by a ball joint. Additionally or alternatively also translatory or linear joints like hinges, parallelogram guides, linear axes or the like are possible.

According to a preferred embodiment of the present invention degrees of freedom of a joint between handling means and means for detecting a position are lockable or self-locking. For example, a ball joint can remain in a rotational position by friction in a self-locking way, until the user changes this position by overcoming an operating force threshold. A ball joint also may be locked in defined rotational positions by notches or pawls or the like, or one or more rotational directions may be locked, for example by screws, activating of holding magnets, activating of brakes or the like. Same obviously also applies for translatory or linear axes of an according joint.

According to a preferred embodiment of the present invention handling means and means for detecting a position are detachably connected with one another. This allows combining of different handling means, for example with different displays and/or actuating elements, with different means for detecting a position, which for example are adapted for being detected by different tracking means.

Accordingly, also the tactile element can be detachably connected to the means for detecting a position in order to enable a combination of different means for detecting a position with different tactile elements, which for example may comprise different geometrical dimensions for contacting working points in different environments or for simulating different tools. Also such tactile elements detachably connected with means for detecting a position are preferably immobile or fixed relative to the means for detecting a position in order to provide a constant transformation between the detected spatial position of the means for detecting a position and the reference point of the tactile element.

According to a preferred embodiment of the present invention, an enabling switch is provided at a handle of the handling means which for example must be actuated by the user to allow manipulator or additional axes to move, and/or to make sure that manipulators proximate to the user do not endanger him. Preferably, the enabling switch can be actuated with the index finger so that other switches can be actuated in particular with the thumb of the hand holding the handling means.

In order to ease efficient detection of reasonable working points, which can be reached by the manipulator, the tactile element may, preferably together with the means for detecting a position, be formed as a dummy tool, i.e. comprising essentially the form of at least a part of an outer contour of the tool with which the manipulator is to reach the working points. Preferably the reference point defined with the tactile element corresponds to the TCP.

According to a preferred embodiment of the present invention the means for detecting a position comprises one or more, preferably at least three, active and/or passive markings which are adapted for being detected by a tracking means. They may for example be emitting active or reflective passive markings having a predetermined geometrical contour, which are detectable by optical tracking means which for example work in the visible or ultraviolet range, or acoustic tracking means which for example work in the ultrasonic range.

Additionally or alternatively means for detecting a position can also comprise one or more, preferably at least three sensors, for example acceleration sensors or sensors of an inertial measurement system or sensors which themselves detect, for example in an optical or acoustic way, active or passive markings of a reference systems and thus also enable detection of the spatial position of the means for detecting a position and thus of the reference point of the tactile element connected thereto.

According to a preferred embodiment the means for detecting a position comprises several markings and/or sensors which are disposed at the circumference of one or more rings which surround the means for detecting a position which preferably comprises a cylindrical shape. This simplifies the detection of the markings of a ring or the detection by sensors of a ring respectively from all directions normal to a perpendicular axis through the centre of this ring and in particular allows rotation of the means for detecting a position around this perpendicular axis without affecting the detection adversely.

Preferably, the means for detecting a position comprises at least two such rings whose perpendicular axes are not coaxial and may in particular include an angle of at least 10° with one another. This increases the visibility at viewing directions of the tracking means or sensors respectively along a perpendicular axis of a ring towards the markings or sensors of the other ring.

Often a tool is moved and brought into contact with a work piece along a predetermined main direction which is aligned under a certain angle which for example may result from the working process, for example essentially normal to a surface of the work piece. For example a gluing or welding gun often is moved vertical with respect to a horizontally orientated surface of a work piece.

On the other hand, cameras of tracking means preferably are aligned under predetermined angles, for example around 45°, with respect to a surface normal of the surface of the work piece. Now, if a detecting direction of markings also is inclined at around 45° with respect to the surface normal of the surface of the work piece when the hand-held device is contacting the work piece, then the cameras which essentially directly view at the detecting direction towards the markings, can detected them in an optimal manner. Generally, alignment of the detecting direction of markings or sensors respectively at a predetermined angle allows for a positioning of the hand-held device within a cone with this opening angle without affecting the detection adversely.

According to a preferred embodiment thus a detecting direction of at least one marking or sensor respectively, in which the detection is advantageous, for example an optical axis of a sensor or the surface normal of a reflecting marking, is inclined at an angle with respect to a main direction of the tactile element and/or the means for detecting a position, for example a longitudinal or symmetry axis, a preferred contacting direction of the tactile element, a working direction of the dummy tool or, with a dummy tool contacting in detecting position, a surface normal of a work piece at which the working point to be detected is located, said angle being in the range between 15° and 75°, in particular between 30° and 60°, and which in particular is around 45°.

According to a second aspect of the present invention, wherein preferably one or more of the aforementioned features according to the first aspect may be realized too, but which, however, also without these features solves the object of the present invention, it is suggested that handling means comprises input means for input by a user to control an additional axis of the manipulator, in particular an axis of a tool table.

Thereby the user can, in particular for reaching different working points in different work piece positions with the hand-held device, actuate additional axes of the manipulator, for example rotational axes of a turn- and/or tilt-table on which the work piece is fixed, in order to position the work piece appropriately, in particular is such a position as it is positioned when processed by the manipulator, without the need to handle a further input device.

According to a third aspect of the present invention, wherein preferably one or more of the aforementioned features according to the first and/or second aspect may be realized too, but which, however, also without these features solves the object of the present invention, it is suggested that firstly a spatial position of a reference point of a hand-held device is detected and subsequently moved by the user along a predetermined direction, in particular a working direction of a tool or a surface normal of a surface of a work piece, for example by inputting a displacement value. The position which is displaced with respect to the detected spatial position along the predetermined direction then will be detected, in particular recorded, as the spatial position of the working point of the manipulator.

During detecting and recording or saving of working point positions, if, due to measurement and numerical tolerances, recorded working points, for example welding or glue points, wrongly come to lay within the contour of the work piece so that there is a danger that the tool moved by the manipulator intrudes into the work piece and thereby damages work piece and/or tool when carrying out a program based on such spatial positions by the manipulator, the user can correct that by moving saved working points which lay within the contour of the work piece out from the contour of the work piece. In particular with multiple saved spatial positions, this, however, is difficult offline without work piece. The present invention according to its third aspect simplifies the detection of working point positions, which preferably are outside the work piece, by, preferably automatically, predetermining a direction, for example the working direction of a tool or the surface normal of a surface of a work piece, displacing positions, which are wrongly detected at first, along this direction and then—now being outside of the work piece—saving them as (correct) working point positions.

Figure 5:
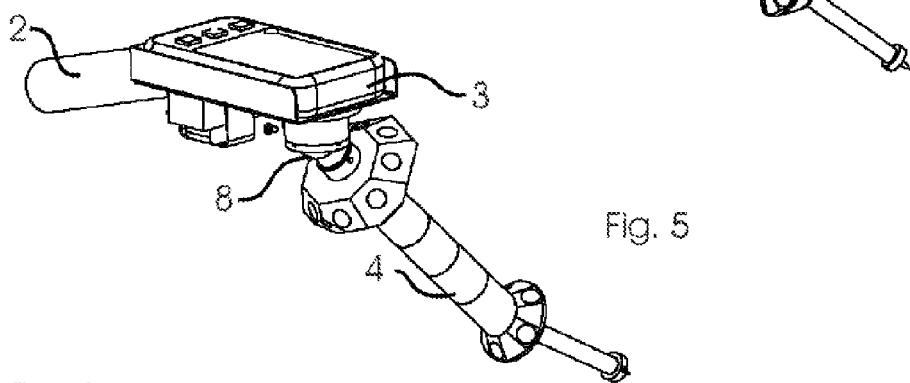
Figure 6:
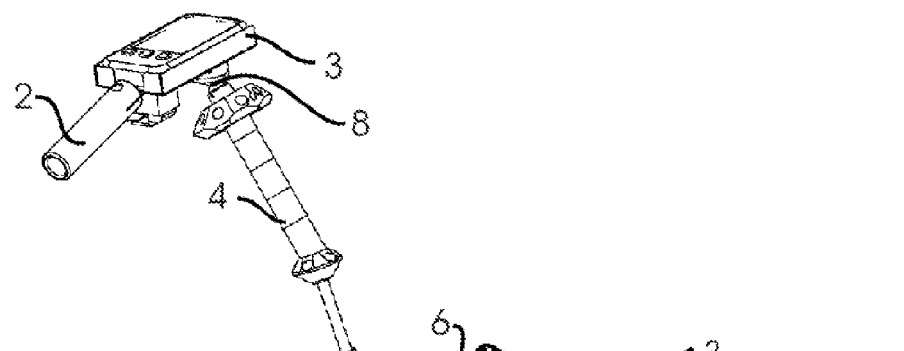
Figure 7:
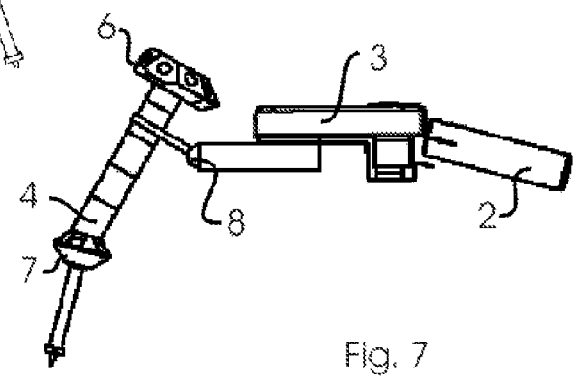

Further advantages and features yield from the dependent claims and the preferred embodiments. Thereto, partially schematically:

FIG. 1: shows a portable hand-held device and a tracking means according to a first embodiment of the present invention in a perspective view;

FIG. 2: shows the hand-held device from FIG. 1 in a side view when contacting a surface of a work piece;

FIG. 3: shows the hand-held device from FIG. 1 when viewed from above;

FIG. 4-6: show the hand-held device from FIG. 1 wherein means for detecting a position is deviated into different positions; and FIG. 7 shows a portable hand-held device according to further embodiment of the present invention in a side view.

FIG. 1 shows a portable hand-held device 1 according to a first embodiment of the present invention in a perspective view. It comprises handling means for handling the hand-held device 1 by a user with a cylindrical handle 2 for the user and input and output means 3 in form of a compact, portable computer, for example a PDA, with a keyboard 3.1 to input instructions by the user and a display 3.2 for displaying information. The PDA 3 is detachably connected to the handle 2 which, on a lower side (below in FIG. 1), comprises an enabling switch 2.1.

By a ball joint 8 (see FIG. 2) means for detecting a position 4 is jointly connected with the handling means 3 and can be tilted and rotated relative to it. The rotational degrees of freedom are self-locking since the ball joint 8 provides a sufficient friction so that handling means 3 and means for detecting a position 4 are fixed relative to one another and can only be moved relative to one another by the user when applying an additional operating force to overcome the friction. Thus, the ball joint 8 remains a current relative position between handling means 3 and means for detecting a position 4 without actuation by the user, however, the User can tilt and rotate handling means 3 and means for detecting a position 4 at the ball joint 8 against each other.

Detachably connected with the means for detecting a position 4 is a changeable tactile element 5 which essential comprises the contour of a welding tool and at whose tip a reference point R is defined which corresponds to the TCP of a real welding tool moved by a manipulator.

To detect the spatial position of the reference point R on the basis of the spatial position of the means for detecting a position 4, this spatial position of the means for detecting a position 4 is detected by optical tracking means 10. To this purpose a first ring 6 surrounds the essentially cylindrical means for detecting a position 4 in such a way that its perpendicular axis 6.2 aligns with the symmetry and longitudinal axis of the means for detecting a position 4. Accordingly, a second ring 7 surrounds the also essentially cylindrical tactile element 5 in such a way that its perpendicular axis 7.2 aligns with the symmetry and longitudinal axis of the tactile element 5, which is essentially perpendicular to the surface of the work piece in a detecting position shown in FIG. 2 and which also corresponds to the working or guiding direction of the real welding tool. The longitudinal axes of the means for detecting a position 4 and the tactile element 5 and thus also the perpendicular axes 6.2, 7.2 of the two rings 6, 7 include an angle 180°-β of around 15°.

Along the circumferences of both rings 6, 7 circular reflecting markings 6.1 and 7.2 are disposed respectively, which are detected by CCD cameras of the tracking means (not shown). The detecting direction of the markings 7.1, i.e. the surface normal 7.3 upon the flat markings, in which they reflect to a maximal extent and thus can be detected by the CCD cameras extremely well, is depicted in FIG. 2 for one marking of ring 7 as a continuous line. As can be seen in FIG. 2, said detecting direction 7.3 is inclined at an angle α of approximately 45° with respect to the longitudinal axis of tactile element 5, i.e. the perpendicular axis 7.2 of ring 7.

Markings 6.1 of ring 6 are aligned in the same direction as their corresponding markings 7.1 of ring 7 respectively. Due to the orientation of the perpendicular axis 6.2, which deviates with respect to the perpendicular axis 7.2 at an angle of approximately 15°, different angular positions result for each marking 6.1 of the markings 6.1 of ring 6. In other words, the orientations of the markings 6.1 do not follow the position of the perpendicular axis 6.2 but the position of the perpendicular axis 7.2.

Upper and lower ring 6, 7 comprise trapezoidal surfaces disposed along their circumferences, wherein at each trapezoidal surface one marking is disposed. The markings are equally orientated with respect to the corresponding trapezoidal surface. Thus, each trapezoidal surface of the markings of upper ring 6 is orientated differently to the perpendicular axis 6.2. As shown in FIG. 2, the trapezoidal surface at the left side of upper ring 6 stands very steeply while the trapezoidal surface at the right side of upper ring 6 stands quite flat. In other words, a trapezoidal surface of upper ring 6 in a certain segment is always orientated parallel to the trapezoidal surface of lower ring 7.

If the tactile element 5 which comprises the form of a dummy tool is placed with its reference point R in a working point to be detected upon a surface of a work piece which is symbolized in FIG. 2 by a horizontal line so that a longitudinal axis 7.2 is essentially perpendicular to the surface of the work piece, the detecting directions of markings 7.1 thereby are inclined with respect to the surface of the work piece essentially at an angle of around 45°. The CCD cameras of the tracking means (not shown) also are inclined essentially at an angle of around 45° with respect to the surface of the work piece for optimal detection. Thus, they essentially directly look onto markings 7.1 which reflect towards the CCD cameras to a maximal extent. Also markings 6.1 of ring 6 of the means for detecting a position 4, which is inclined at the angle of 15°, are inclined with respect to the perpendicular axis 7.2 of lower ring 7 at around 45° and can thus well be detected by the CCD cameras as well.

Due to the kink or bend between the perpendicular axes 6.2, 7.2 of rings 6, 7, a complete optical coverage of ring 7 by ring 6 is avoided as in particular can bee seen in the view form above of FIG. 3. Thus, both marking rings 6, 7 can be detected from a variety of camera positions and in a variety of different orientations of the hand-held device 1.

As shown in FIGS. 4 to 6 by way of example, by tilting and rotating the means for detecting a position 4 at ball joint 8 relative to the handling means 2, 3, a variety of different orientations of dummy tool 5 can be provided while maintaining an ergonomically advantageous position of handle 2, display 3.2 and keyboard 3.1. Due to the features of the means for detecting a position 4 explained above, at the same time markings 6.1, 7.1 can be detected well by the optical tracking means wherein due to the constant fixation of the tactile element 5 at the means for detecting a position 4 the transformation from reference point R into a coordinate system of the means for detecting a position 4 whose position is detectable via markings 6.1, 7.1, remains constant.

By actuating a switch or key 3.1, the user can actuate an additional axis of a turn and tilt table (not shown) and thereby move a work piece fixed to that table on which he wants to detect working points with the hand-held device 1. Said switch can be a multi-functional switch which actuates the additional axis only if an according menu has been chosen before. In a modification not shown, the display 3.2 may be realized as a touch screen on which one or more input keys are defined.

In FIG. 2 one can see the position of the reference point R of the hand-held device in the detecting posture on the surface of the work piece. Without measurement or numerical errors, the spatial position of this reference point on the surface of the work piece is saved as spatial position of a working point. Due to measurement or numerical errors, however, the spatial position of the such-saved working point can wrongly occur within the contour of the work piece (below the horizontal line in FIG. 2). This results in a collision of the tip of the welding tool with the work piece when carrying out a program with this saved wrong spatial position. Therefore, according to a method according to the present invention, the main direction which is defined by the tactile element 5, i.e. generally the working direction of the tool, is predetermined as a displacement direction. Already when saving the spatial position, or alternatively during post-processing or controlling of the saved or recorded working points, the user can move the saved wrong position out of the work piece in the predetermined displacement direction in a definite and well-controlled way by inputting an adequate displacement value and save this so-displaced position as the (correct) working point for the manipulator. In this way the collision-free spatial position outside the work piece is saved as a desired work point. It can be displaced along the displacement direction when subsequently moving the tool by the manipulator until it contacts the surface of the work piece.

REFERENCE SIGNS 1 hand-held device
2 handle (handling means)
2.1 enabling switch
3 portable computer (handling means)
3.1 key (input means)
3.2 display (output means)
4 means for detecting a position
5 tactile element
6, 7 marking ring
6.1, 7.1 reflecting markings
6.2, 7.2 perpendicular axis
8 ball joint
α angle between direction of detection and main direction
180°-β angle between perpendicular axis of the marking ring
R reference point (TCP)

The invention claimed is:

1. A portable hand-held device for detecting the spatial position of a working point of a robotic manipulator, comprising:
    handling means for handling the hand-held device by a user;
    means for detecting a position, wherein a spatial position of the means for detecting a position is detectable; and
    a tactile element which is connected to the means for detecting a position and at which a reference point is defined;
    wherein the handling means and the means for detecting a position are connected with one another by a joint, such that the handling means and the means for detecting a position are movable relative to each other; and
    wherein the portable hand-held device is positionable, in hand-held operation, to cooperate with a tracking device in order to detect the spatial position of a working point of a robotic manipulator based on detection of the spatial position of the means for detecting a position; and
    wherein the handling means comprises an input configured to receive instructions from the user.

2. A hand-held device according to claim 1, wherein handling means and means for detecting a position are connected with one another in a rotational joint with at least one rotational degree of freedom which preferably is lockable or self-locking.

3. A hand-held device according to claim 1, wherein handling means comprise output means for output to the user and/or a handle for the user.

4. A hand-held device according to claim 3, wherein an enabling switch is disposed at a handle of the handling means.

5. A hand-held device according to claim 1, wherein the tactile element or the means for detecting a position and tactile element connected thereto essentially comprise the form of at least a part of a contour of a tool of the manipulator.

6. A hand-held device according to claim 1, wherein the means for detecting a position comprises at least one active and/or passive marking and/or at least one sensor for detecting the spatial position.

7. A hand-held device according to claim 1, wherein the means for detecting a position comprises markings and/or sensors for detecting the spatial position, the markings and/or sensors being disposed along the circumference of at least one ring surrounding the means for detecting a position.

8. A hand-held device according to claim 7, wherein the means for detecting a position comprises a first ring and a second ring, wherein the markings and/or sensors are disposed along the circumferences of the first and second rings, and wherein the perpendicular axis of the first ring includes an angle which does not equal 0° with the perpendicular axis of the second ring.

9. A hand-held device according to claim 1, wherein a detecting direction of at least one marking and/or sensor is inclined at an angle with respect to a main direction of the, preferably essentially cylindrical, tactile element and/or the, preferably essentially cylindrical, means for detecting a position, wherein said angle is in the range between 15° and 75°, preferably in the range between 30° and 60°.

10. A portable hand-held device for detecting the spatial position of a working point of a robotic manipulator, comprising:
handling means for handling the hand-held device by a user, comprising input means for input by the user;
means for detecting a position, wherein a spatial position of the means for detecting a position is detectable; and
a tactile element which is connected to the means for detecting a position and at which a reference point is defined;
characterized in that the input means is configured to control at least one additional axis of the manipulator,
wherein the portable hand-held device is positionable, in hand-held operation, to cooperate with a tracking device in order to detect the spatial position of the working point of the robotic manipulator based on detection of the spatial position of the means for detecting a position, and
wherein the handling means comprises an input configured to receive instructions from the user.

11. A method for detecting the spatial position of a working point of a robotic manipulator, the method comprising:
positioning a hand-held device, the handheld device comprising
handling means for handling the handheld device by a user,
means for detecting a position, wherein a spatial position of the means for detecting a position is detectable, and
a tactile element which is connected to the means for detecting a position and at which a reference point is defined,
wherein the handling means and means for detecting a position are connected with each other by a joint;
detecting, via a tracking device, a spatial position of the reference point of the positioned hand-held device; and
determining the working point of the robotic manipulator, wherein the working point of the robotic manipulator is a position which is displaced with respect to the detected spatial position in a predetermined direction.

12. A computer program product with program code which is recorded on a non-transitory carrier readable by a computer and which comprises a computer program, which carries out a method when running on a computer, the method comprising:
detecting, via a tracking device, a spatial position of a reference point of a hand-held device, the hand-held device comprising
handling means for handling the handheld device by a user,
means for detecting a position, wherein a spatial position of the means for detecting a position is detectable, and
a tactile element which is connected to the means for detecting a position and at which the reference point is defined,
wherein the handling means and means for detecting a position are connected with each other by a joint; and
determining the working point of a robotic manipulator, wherein the working point of the manipulator is a position which is displaced with respect to the detected spatial position in a predetermined direction.

* * * * *